(12) United States Patent
Kavanagh et al.

(10) Patent No.: US 7,652,103 B2
(45) Date of Patent: *Jan. 26, 2010

(54) ACRYLIC PRESSURE-SENSITIVE ADHESIVES WITH AZIRIDINE CROSSLINKING AGENTS

(75) Inventors: Maureen A. Kavanagh, Stanchfield, MN (US); Kelly S. Anderson, Houlton, WI (US); Belma Erdogan, Woodbury, MN (US); Larry R. Krepski, White Bear Lake, MN (US); Sanat Mohanty, Minneapolis, MN (US); Timothy D. Filiatrault, Maplewood, MN (US); Babu N. Gaddam, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 10 days.

This patent is subject to a terminal disclaimer.

(21) Appl. No.: 12/031,535

(22) Filed: Feb. 14, 2008

(65) Prior Publication Data

US 2009/0208740 A1 Aug. 20, 2009

(51) Int. Cl.
*C08F 8/30* (2006.01)
(52) U.S. Cl. ............... 525/329.9; 525/330.1; 525/330.5; 525/374; 525/375; 156/60; 156/325; 156/327; 534/639; 428/522
(58) Field of Classification Search ............... 525/329.9, 525/375
See application file for complete search history.

(56) References Cited

U.S. PATENT DOCUMENTS

| | | | |
|---|---|---|---|
| 3,243,429 A | 3/1966 | Ham | |
| 3,337,533 A * | 8/1967 | Ham | ............... 548/964 |
| 3,691,140 A | 9/1972 | Silver | |
| 4,026,880 A | 5/1977 | Mitchell | |
| 4,166,152 A | 8/1979 | Baker et al. | |
| 4,225,665 A | 9/1980 | Schadt, III | |
| 4,605,698 A * | 8/1986 | Briden | ............... 524/559 |
| 4,636,432 A | 1/1987 | Shibano et al. | |
| 4,656,218 A | 4/1987 | Kinoshita | |
| 5,045,569 A | 9/1991 | Delgado | |
| 5,506,279 A | 4/1996 | Babu et al. | |
| 5,902,836 A | 5/1999 | Bennett et al. | |
| 6,521,682 B1 | 2/2003 | Costantino et al. | |
| 7,385,020 B2 | 6/2008 | Anderson et al. | |
| 7,393,901 B1 | 7/2008 | Filiatrault et al. | |
| 2004/0116598 A1 * | 6/2004 | Guo et al. | ............... 524/804 |
| 2007/0299211 A1 * | 12/2007 | Chen et al. | ............... 525/329.7 |

FOREIGN PATENT DOCUMENTS

| | | |
|---|---|---|
| EP | 1 179 577 | 2/2002 |
| WO | WO 02/38694 A1 | 5/2002 |
| WO | WO 2004/029171 A1 | 4/2004 |
| WO | WO 2008/100713 | 8/2008 |

OTHER PUBLICATIONS

Partial Search Report, PCT/US2009/033294.
Pocius, "Adhesion and Adhesives Technology, An Introduction", (2002), 2nd Edition, Hanser Gardner Publications, Inc., Cincinnati, OH.
PSTC-7, "Holding Power of Pressure Sensitive Tape", Revised (1989), pp. 37-39.
ASTM D 3330/D 3330M-04, "Standard Test Method for Peel Adhesion of Pressure-Sensitive Tape", (2004), pp. 1-6, ASTM Int'l.
ASTM D 3654/D 3654M-06, "Standard Test Methods for Shear Adhesion of Pressure-Sensitive Tapes", (2006), pp. 1-6, ASTM Int'l.
U.S. Appl. No. 11/765,963 entitled "Pressure-Sensitive Adhesive Containing Aziridinyl Silanes", filed Jun. 20, 2007.
U.S. Appl. No. 12/056,895 entitled "Acrylic Pressure-sensitive Adhesives with Aziridine Crosslinking Agents", filed Mar. 27, 2008.
Rosenthal et al., "The Synthesis of β-Amino Mercaptans and β-Amino Thiosulfates via Ethylenimine Intermediates", Journal of Organic Chemistry, vol. 30, Issue 11, Nov. 1965, pp. 3689-3696.
McCormick et al., "Water-Soluble Polymers," Encyclopedia of Polymer Science and Technology, pp. 452-521, Jul. 2004.

* cited by examiner

*Primary Examiner*—Vasu Jagannathan
*Assistant Examiner*—Robert C Boyle
(74) *Attorney, Agent, or Firm*—Kent S. Kokko

(57) ABSTRACT

A pre-adhesive composition is described comprising an acid-functional (meth)acrylate copolymer and an aziridine crosslinking agent, which when crosslinked provides a pressure-sensitive adhesive and pressure-sensitive adhesive articles.

18 Claims, No Drawings

ACRYLIC PRESSURE-SENSITIVE ADHESIVES WITH AZIRIDINE CROSSLINKING AGENTS

TECHNICAL FIELD OF THE INVENTION

This invention relates to pressure sensitive adhesives and tape articles prepared therefrom. The tapes are characterized by exhibiting an overall balance of adhesive and cohesive characteristics and exceptional load bearing capabilities at elevated temperatures.

BACKGROUND OF THE INVENTION

Pressure sensitive tapes are virtually ubiquitous in the home and workplace. In its simplest configuration, a pressure sensitive tape comprises an adhesive and a backing, and the overall construction is tacky at the use temperature and adheres to a variety of substrates using only moderate pressure to form the bond. In this fashion, pressure sensitive tapes constitute a complete, self-contained bonding system.

According to the Pressure-Sensitive Tape Council, pressure-sensitive adhesives (PSAs) are known to possess properties including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.). PSAs do not embrace compositions merely because they are sticky or adhere to a surface.

These requirements are assessed generally by means of tests which are designed to individually measure tack, adhesion (peel strength), and cohesion (shear holding power), as noted in A. V. Pocius in Adhesion and Adhesives Technology: An Introduction, $2^{nd}$ Ed., Hanser Gardner Publication, Cincinnatti, Ohio, 2002. These measurements taken together constitute the balance of properties often used to characterize a PSA.

With broadened use of pressure sensitive tapes over the years, performance requirements have become more demanding. Shear holding capability, for example, which originally was intended for applications supporting modest loads at room temperature, has now increased substantially for many applications in terms of operating temperature and load. So-called high performance pressure sensitive tapes are those capable of supporting loads at elevated temperatures for 10,000 minutes. Increased shear holding capability has generally been accomplished by crosslinking the PSA, although considerable care must be exercised so that high levels of tack and adhesion are retained in order to retain the aforementioned balance of properties.

There are two major crosslinking mechanisms for acrylic adhesives: free-radical copolymerization of multifunctional ethylenically unsaturated groups with the other monomers, and covalent or ionic crosslinking through the functional monomers, such as acrylic acid. Another method is the use of UV crosslinkers, such as copolymerizable benzophenones or post-added photocrosslinkers, such as multifunctional benzophenones and triazines. In the past, a variety of different materials have been used as crosslinking agents, e.g., polyfunctional acrylates, acetophenones, benzophenones, and triazines. The foregoing crosslinking agents, however, possess certain drawbacks which include one or more of the following: high volatility; incompatibility with certain polymer systems; generation of corrosive or toxic by-products; generation of undesirable color; requirement of a separate photoactive compound to initiate the crosslinking reaction; and high sensitivity to oxygen.

SUMMARY

Briefly, the present disclosure provides a pre-adhesive composition comprising an acid-functional (meth)acrylate copolymer and an aziridine crosslinking agent. In one aspect, the disclosure provides a novel pre-adhesive syrup polymer composition comprising a) a first component acid-functional (meth)acrylate solute copolymer, b) a second component comprising at least one free-radically polymerizable solvent monomer, and c) an aziridine crosslinking agent. The pre-adhesive syrup polymer composition may be polymerized and cured to produce a pressure-sensitive adhesive.

In another embodiment the disclosure provides an adhesive emulsion comprising an aqueous emulsion of the acid-functional (meth)acrylate copolymer, and the aziridine crosslinking agent which may be coated and dried to form a pressure sensitive adhesive. In a related embodiment, the present disclosure provides an adhesive emulsion comprising an aqueous emulsion of the reaction product of the acid-functional (meth)acrylate copolymer, and the aziridine crosslinking agent which may be coated and dried to form a pressure sensitive adhesive.

The pressure-sensitive adhesives, the crosslinked compositions, of this disclosure provide the desired balance of tack, peel adhesion, and shear holding power, and further conform to the Dahlquist criteria; i.e. the modulus of the adhesive at the application temperature, typically room temperature, is less than $3 \times 10^6$ dynes/cm at a frequency of 1 Hz.

The use of the aziridine crosslinking agent affords a number of advantages as compared to the use of conventional crosslinking agents for (meth)acrylic adhesives. These advantages include, but are not limited to, decreased sensitivity of the crosslinkable composition to oxygen; the avoidance of evolution of any toxic or corrosive by-products or discoloration of the final product; and the capability to be used as a post-curing crosslinking additive. Furthermore, the crosslinking agents have the following advantages over previously described agents: ease of synthesis, high solubility in the component monomers or organic solvents, and low cost starting materials.

In some embodiments, this disclosure provides an adhesive composition derived from renewable resources. In particular, the present invention provides an adhesive composition derived, in part, from plant materials. In some embodiments, the present invention further provides an adhesive article, wherein the substrate or backing is also derived from renewable resources. The increase in the price of oil, and concomitant petroleum-derived products, has led to volatile prices and supply for many adhesive products. It is desirable to replace all or part of the petroleum-based feedstocks with those derived from renewable sources, such as plants, as such materials become relatively cheaper, and are therefore both economically and socially beneficial. Therefore, the need for such plant-derived materials has become increasingly significant.

In this application "pre-adhesive" refers to the solution comprising a functional acid-functional (meth)acrylate solute copolymer, a second solvent monomer component and third component aziridine crosslinking agent which may be polymerized and crosslinked to form a pressure sensitive adhesive. "Syrup polymer" refers to a solution of a solute polymer in one or more solvent monomers, the solution having a viscosity of from 500 to 10,000 cPs at 22° C. "Solution polymer" refers to a solution of a solute polymer in one or more organic solvents.

In this application, (meth)acrylic is inclusive of both methacrylic and acrylic. For environmental reasons, there is a desire to move away from the use of volatile organic solvents (VOC's) in coating processes, and towards more environmentally friendly water-based materials, so the present invention provides a waterborne adhesive comprising an aqueous emulsion supra. Waterborne systems are desirable for cost, environmental, safety, and regulatory reasons. The aqueous system may be readily coated, and provides a pressure-sensitive adhesive when dried. In other embodiments, the adhesive copolymer may be prepared by syrup polymerization methods, comprising a solution of a solute polymer in one or more solvent monomers, which may be coated and polymerized without the use of volatile organic solvents.

DETAILED DESCRIPTION

The present disclosure provides a pre-adhesive composition comprising an acid-functional (meth)acrylate copolymer and an aziridine crosslinking agent, which when crosslinked, provides a pressure-sensitive adhesive and pressure-sensitive adhesive articles.

The (meth)acrylate ester monomer useful in preparing the acid functional (meth)acrylate adhesive copolymer is a monomeric (meth)acrylic ester of a non-tertiary alcohol, which alcohol contains from 1 to 14 carbon atoms and preferably an average of from 4 to 12 carbon atoms.

Examples of monomers suitable for use as the (meth)acrylate ester monomer include the esters of either acrylic acid or methacrylic acid with non-tertiary alcohols such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, isooctylalcohol, 2-ethyl-1-hexanol, 3,7-dimethylheptanol, 3,7-dimethylhept3-eneol, 1-decanol, 1-dodecanol, 1-tridecanol, 1-tetradecanol, citronellol, dihydrocitronellol, and the like. In some embodiments, the preferred (meth)acrylate ester monomer is the ester of (meth)acrylic acid with butyl alcohol or isooctyl alcohol, or a combination thereof, although combinations of two or more different (meth)acrylate ester monomer are suitable. In some embodiments, the preferred (meth)acrylate ester monomer is the ester of (meth)acrylic acid with an alcohol derived from a renewable sources, such as 2-octanol, citronellol, dihydrocitronellol.

The (meth)acrylate ester monomer is present in an amount of 85 to 99 parts by weight based on 100 parts total monomer content used to prepare the polymer. Preferably (meth)acrylate ester monomer is present in an amount of 90 to 95 parts by weight based on 100 parts total monomer content.

The polymer further comprises an acid functional monomer, where the acid functional group may be an acid per se, such as a carboxylic acid, or a portion may be salt thereof, such as an alkali metal carboxylate. Useful acid functional monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, β-carboxyethyl(meth)acrylate, 2-sulfoethyl methacrylate, styrene sulfonic acid, 2-acrylamido-2-methylpropanesulfonic acid, vinylphosphonic acid, and mixtures thereof.

Due to their availability, acid functional monomers of the acid functional copolymer are generally selected from ethylenically unsaturated carboxylic acids, i.e. (meth)acrylic acids. When even stronger acids are desired, acidic monomers include the ethylenically unsaturated sulfonic acids and ethylenically unsaturated phosphonic acids. The acid functional monomer is generally used in amounts of 1 to 15 parts by weight, preferably 1 to 5 parts by weight, based on 100 parts by weight total monomer.

The polar monomers useful in preparing the copolymer are both somewhat oil soluble and water soluble, resulting in a distribution of the polar monomer between the aqueous and oil phases in an emulsion polymerization. Useful polar monomers are non-acid functional.

Representative examples of suitable polar monomers include but are not limited to 2-hydroxyethyl(meth)acrylate; N-vinylpyrrolidone; N-vinylcaprolactam; acrylamide; mono- or di-N-alkyl substituted acrylamide; t-butyl acrylamide; dimethylaminoethyl acrylamide; N-octyl acrylamide; poly(alkoxyalkyl)(meth)acrylates including 2-(2-ethoxyethoxy)ethyl(meth)acrylate, 2-ethoxyethyl(meth)acrylate, 2-methoxyethoxyethyl(meth)acrylate, 2-methoxyethyl methacrylate, polyethylene glycol mono(meth)acrylates; alkyl vinyl ethers, including vinyl methyl ether; and mixtures thereof. Preferred polar monomers include those selected from the group consisting of 2-hydroxyethyl (meth)acrylate and N-vinylpyrrolidinone. The polar monomer may be present in amounts of 0 to 10 parts by weight, preferably 1 to 5 parts by weight, based on 100 parts by weight total monomer.

When used, vinyl monomers useful in the (meth)acrylate polymer include vinyl esters (e.g., vinyl acetate and vinyl propionate), styrene, substituted styrene (e.g., α-methyl styrene), vinyl halide, and mixtures thereof. Such vinyl monomers are generally used at 0 to 5 parts by weight, preferably 1 to 5 parts by weight, based on 100 parts by weight total monomer.

In order to increase cohesive strength of the coated adhesive composition, a multifunctional (meth)acrylate may be incorporated into the blend of polymerizable monomers. Multifunctional acrylates are particularly useful for emulsion or syrup polymerization. Examples of useful multifunctional (meth)acrylate include, but are not limited to, di(meth)acrylates, tri(meth)acrylates, and tetra(meth)acrylates, such as 1,6-hexanediol di(meth)acrylate, poly(ethylene glycol) di(meth)acrylates, polybutadiene di(meth)acrylate, polyurethane di(meth)acrylates, and propoxylated glycerin tri(meth)acrylate, and mixtures thereof The amount and identity of multifunctional (meth)acrylate is tailored depending upon application of the adhesive composition. Typically, the multifunctional (meth)acrylate is present in amounts less than 5 parts based on total dry weight of adhesive composition. More specifically, the crosslinker may be present in amounts from 0.01 parts to 1 part based on 100 parts total monomers of the adhesive composition.

The adhesive composition further comprises an aziridine crosslinking agent, in addition to the (meth)acrylate copolymer. The aziridine crosslinking agent is generally added in amounts of 0.005 to 5.0 parts by weight of an aziridine crosslinking agent, relative to 100 parts of the copolymer.

The aziridine crosslinking agent is of the general formula:

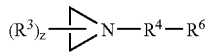

I wherein
$R^3$ is $C_1$-$C_4$ alkyl group attached to carbon 1 and/or carbon 2, and z is 0, 1 or 2; preferably 0 or 1;
$R^4$ is a divalent alkylene, optionally substituted by one or more ester groups, urea groups and/or urethane groups;
$R^6$ is a monovalent alkyl or aryl group.

As used herein, the term "alkyl", is inclusive of both saturated or unsaturated straight chain and branched chain groups, and of cyclic groups, i.e. cycloalkyl and cycloalkenyl. Unless otherwise specified, these groups contain from 1 to 20 carbon atoms, with preferred groups having a total of up to 10 carbon atoms. Cyclic groups can be monocyclic or polycyclic and preferably have from 3 to 10 ring carbon atoms. Exemplary cyclic groups include cyclopropyl, cyclopropylmethyl, cyclopentyl, cyclohexyl, and adamantyl. The term "aryl" as used herein includes carbocyclic aromatic rings or ring systems. Examples of aryl groups include phenyl, naphthyl, biphenyl, fluorenyl and indenyl.

In one method, the aziridine crosslinking agent may be prepared by reacting an aziridine compound having nucleophilic or electrophilic functional groups, with an alkyl or aryl compound having a co-reactive functional group. Useful reactive functional groups include, but are not limited to, hydroxyl, amino, acetoacetyl, azlactonyl, carboxyl, isocyanato, epoxy, acyl halide, and cyclic anhydride groups. Preferred among these is carboxyl, hydroxyl, amino, azlactonyl and isocyanato groups. Where the reactive functional group is an isocyanato functional group, the co-reactive functional group preferably comprises a amino or hydroxyl group. Where the reactive functional group comprises a hydroxyl group, the co-reactive functional group preferably comprises a carboxyl, ester, acyl halide, isocyanato, epoxy, anhydride, azlactonyl or oxazolinyl group. Where the reactive functional group comprises a carboxyl group, the co-reactive functional group preferably comprises a hydroxyl, amino, epoxy, isocyanate, or oxazolinyl group.

This may be simply illustrated by the reaction of a hydroxy-functional aziridine compound with an isocyanate functional compound:

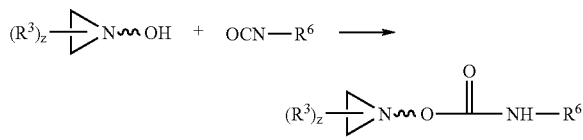

Thus, the present invention may use aziridine crosslinking agents of the formula:

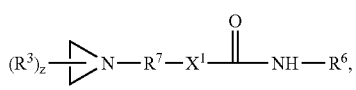

II wherein
$R^3$ is H or a $C_1$-$C_4$ alkyl group,
$R^7$ is a divalent alkylene,
$X^1$ is —$NR^3$— or —O—,
$R^6$ is a monovalent alkyl or aryl group, and
z is 0, 1 or 2.

By another method, the aziridine crosslinking agents may be prepared by Michael addition of an aziridine with an acryloyl compound, using the general procedure described in U.S. Pat. No. 3,243,429 (Ham).

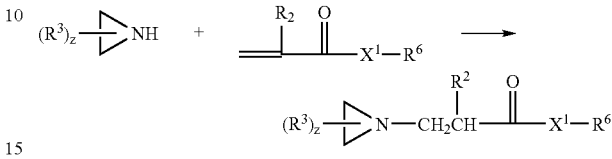

wherein:
$R^2$ is —H, or —$CH_3$;
$R^3$ is H or a $C_1$-$C_4$ alkyl group,
$X^1$ is —$NR^3$— or —O—,
$R^6$ is a monovalent alkyl or aryl group, and —z is 0, 1 or 2.

With respect to the above-described Michael addition, the present disclosure provides novel aziridine compounds of the formulas:

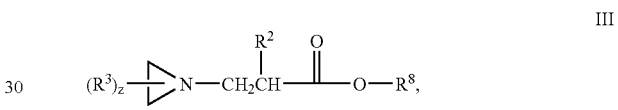

III where
$R^2$ is —H, or —$CH_3$;
$R^3$ is H or a $C_1$-$C_4$ alkyl group,
$R^8$ is a monovalent alkyl group or an aryl group; and
z is 0, 1 or 2; or

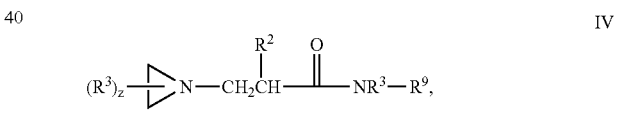

IV where
$R^2$ is —H, or —$CH_3$;
$R^3$ is H or a $C_1$-$C_4$ alkyl group,
$R^9$ is a monovalent alkyl or aryl group, and
z is 0, 1 or 2.

In a variation of the above-depicted Michael addition, an alkyl amine can undergo 1,4-Michael addition to an acryloyl functional aziridine compound as described in U.S. Pat. No. 4,026,880 (Mitchell).

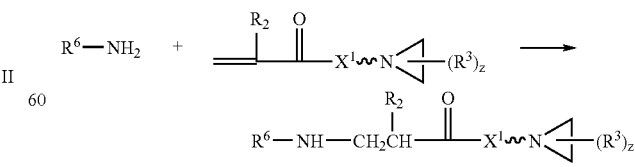

where
$R^2$ is —H, or —$CH_3$;
$R^3$ is H or a $C_1$-$C_4$ alkyl group, $X^1$ is $-NR^3-$ or $-O-$,
$R^6$ is a monovalent alkyl or aryl group, and
z is 0, 1 or 2.

Thus, the present invention may use aziridine compounds of the formula:

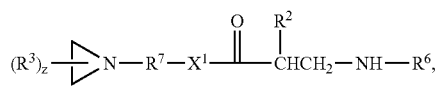

V where
$R^2$ is $-H$, or $-CH_3$;
$R^3$ is H or a $C_1$-$C_4$ alkyl group,
z is 0, 1 or 2;
$R^7$ is a divalent alkylene,
$X^1$ is $-NR^3-$ or $-O-$, and
$R^6$ is a monovalent alkyl or aryl group.

It is believed that the aziridine group reacts with the pendent acid functional groups of the acid functional (meth)acrylate copolymer to form a carboxyethyleneamino linkage. In one embodiment, the intermediate may be of the following structure, with the optional monomer units and unreacted (free) acid functional monomer units not shown.

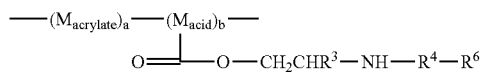

where
$M_{acrylate}$ represents polymerized monomer units derived from (meth)acrylate monomers,
$M_{acid}$ represents polymerized monomer units derived from acid functional monomers,
a and b are integers of at least one, such that a+b is polymeric,
$R^3$ is H or a $C_1$-$C_4$ alkyl group,
$R^4$ is a divalent alkylene, optionally substituted by one or more ester groups, urea groups and/or urethane groups, and
$R^6$ is a monovalent alkyl or aryl group.

In a preferred embodiment, the intermediate may be of the following structure, with the optional monomer units not shown:

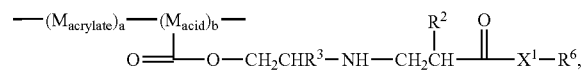

where
$M_{acrylate}$ represents polymerized monomer units derived from (meth)acrylate monomers,
$M_{acid}$ represents polymerized monomer units derived from acid functional monomers,
a and b are integers of at least one, such that a+b is polymeric,
$R^2$ is H or $CH_3$;
$R^3$ is H or a $C_1$-$C_4$ alkyl group, and
$R^6$ is a monovalent alkyl or aryl group. It will be understood that the $R^3$ group may be on the indicated carbon, or attached to the carbon adjacent to the ester oxygen atom, depending on the ring opening of the aziridine group.

Subsequently, the amine resulting from the ring opening may form an ionic bond with an adjacent pendent acid group, to ionically crosslink the copolymer.

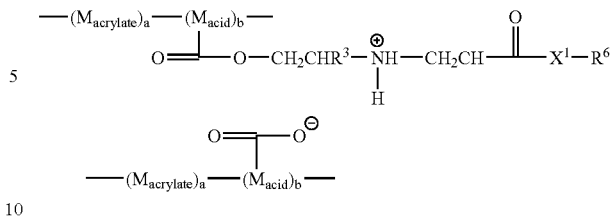

It is further believed that the ionic bond is subsequently converted to an amide forming a covalent crosslink from the ionic crosslink, and inferred from IR and dynamic mechanical analysis (DMA). It will be clear that such amide linkages may also result from the reaction of the secondary amine (from the aziridine) with a pendent ester group from the ester monomer units.

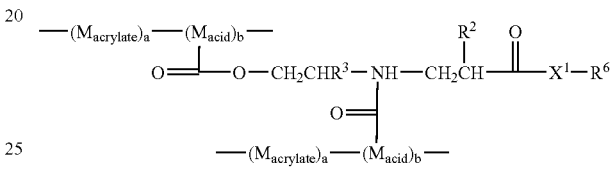

The polymers herein can be prepared by any conventional free radical polymerization method, including solution, radiation, bulk, dispersion, emulsion, and suspension processes. The (meth)acrylate polymers may be prepared via suspension polymerizations as disclosed in U.S. Pat. No. 3,691,140 (Silver); U.S. Pat. No. 4,166,152 (Baker et al.); U.S. Pat. No. 4,636,432 (Shibano et al); U.S. Pat. No. 4,656,218 (Kinoshita); and U.S. Pat. No. 5,045,569 (Delgado). Each describes adhesive compositions, and the descriptions of polymerization processes are incorporated herein by reference.

Water-soluble and oil-soluble initiators useful in preparing the (meth)acrylate adhesive polymers used in the present invention are initiators that, on exposure to heat, generate free-radicals which initiate (co)polymerization of the monomer mixture. Water-soluble initiators are preferred for preparing the (meth)acrylate polymers by emulsion polymerization.

Suitable water-soluble initiators include but are not limited to those selected from the group consisting of potassium persulfate, ammonium persulfate, sodium persulfate, and mixtures thereof, oxidation-reduction initiators such as the reaction product of the above-mentioned persulfates and reducing agents such as those selected from the group consisting of sodium metabisulfite and sodium bisulfite; and 4,4'-azobis(4-cyanopentanoic acid) and its soluble salts (e.g., sodium, potassium). The preferred water-soluble initiator is potassium persulfate. Suitable oil-soluble initiators include but are not limited to those selected from the group consisting of azo compounds such as VAZO™ 64 (2,2'-azobis(isobutyronitrile)), VAZO™ 67 (2,2'azobis(2-methylbutyronitrile)), and VAZO™ 52 (2,2'-azobis(2,4-dimethylpentanenitrile)), available from E.I. du Pont de Nemours Co., peroxides such as benzoyl peroxide and lauroyl peroxide, and mixtures thereof. The preferred oil-soluble thermal initiator is 2,2'-azobis(2,4-dimethylpentanenitrile. When used, initiators may comprise from about 0.05 to about 1 part by weight, preferably about 0.1 to about 0.5 part by weight based on 100 parts by weight of monomer components in the pressure sensitive adhesive.

The copolymerizable emulsion mixture may optionally further comprise chain transfer agents to control the molecular weight of the resultant polymer. Examples of useful chain transfer agents include but are not limited to those selected from the group consisting of carbon tetrabromide, alcohols, mercaptans, and mixtures thereof. When present, the preferred chain transfer agents are isooctylthioglycolate and carbon tetrabromide. The emulsion mixture may further comprise up to about 0.5 parts by weight of a chain transfer agent, typically about 0.01 to about 0.5 parts by weight, if used, preferably about 0.05 parts by weight to about 0.2 parts by weight, based upon 100 parts by weight of the total monomer mixture.

Emulsion

Polymerization via emulsion techniques may require the presence of an emulsifier (which may also be called an emulsifying agent or a surfactant). Useful emulsifiers for the present invention include those selected from the group consisting of anionic surfactants, cationic surfactants, nonionic surfactants, and mixtures thereof.

Preferably, the emulsion polymerization of this invention is carried out in the presence of anionic surfactant(s). A useful range of emulsifier concentration is from about 0.5 to about 8 weight percent, preferably from about 1 to about 5 weight percent, based on the total weight of all monomers of the emulsion pressure sensitive adhesive.

The pressure sensitive adhesives may also contain one or more conventional additives. Preferred additives include tackifiers, plasticizers, dyes, antioxidants, and UV stabilizers. Such additives can be used if they do not affect the superior properties of the emulsion pressure sensitive adhesives.

If tackifiers are used, then up to about 40% by weight, preferably less than 30% by weight, and more preferably less than 5% by weight based on the dry weight of the total adhesive polymer would be suitable. Suitable tackifiers for use with (meth)acrylate polymer dispersions include rosin acids, rosin esters, terpene phenolic resins, hydrocarbon resins, and cumarone indene resins. The type and amount of tackifier can affect properties such as contactability, bonding range, bond strength, heat resistance and specific adhesion. The tackifier will generally be used in the form of an aqueous dispersion. Commercially available tackifiers that are suitable include TACOLYN™ 1070, 5001 and 5002 (aqueous, 55% solids synthetic resin dispersions based on low molecular weight thermoplastic resins, available from Hercules Inc.), SE1055™ (an aqueous dispersion of a rosin ester, available from Hercules Inc.), ESCOREZ™ 9271 (an aliphatic hydrocarbon resin emulsion, available from Exxon), DERMULSENE™ 82, DERMULSENE™ 92, DERMULSENE™ DT or DERMULSENE™ DT50 (aqueous dispersions of modified terpene phenolic resins, available from DRT) and AQUATAK™ 4188 (a modified rosin ester, available from Arizona Chemical Company).

The (meth)acrylate copolymer may be prepared by an emulsion polymerization process. In emulsion polymerization a reaction occurs in micelles or emulsion microdrops suspended in aqueous medium. Any heat generated in the microdrops or micelles is quickly moderated by the effect of the heat capacity of the surrounding water phase. Emulsion polymerization proceeds with better control of exothermic reactions, and the resulting adhesive composition is non-flammable as the aqueous medium is the dominant component. Aziridine crosslinking agents of Formula II where $R^8$ is methyl or ethyl are particularly suitable in emulsion processes.

The pressure sensitive adhesives of the present invention are prepared by a batch, continuous or semi-continuous emulsion polymerization process. The polymerization generally comprises the steps of:
(a) making a monomer premix comprising
  (i) a (meth)acrylic acid ester monomer,
  (ii) an acid functional monomer;
  (iii) optionally a polar monomer,
  (iv) optionally a vinyl monomer,
  (v) optionally a multifunctional (meth)acrylate;
  (vi) optionally a chain transfer agent,
(b) combining said premix with a water phase comprising
  (i) water,
  (ii) a surfactant selected from the group consisting of anionic surfactants, nonionic surfactants, cationic surfactants, amphoteric surfactants, polymeric surfactants, and mixtures thereof,
  (iii) a free radical initiator, preferable a water soluble initiator,
(c) concurrently agitating and heating said emulsion to a temperature of about 30° C. to about 80° C., and permitting polymerization of said monomers in the oil-in-water emulsion until a polymeric latex is formed. It will be understood that other mixtures may be used. For example, the acid functional monomer, or other hydrophilic monomers, may be added to the aqueous solution. In addition, once the emulsion mixture is prepared, the monomers may partition between the oil phase and the water phase, according to their respective partition coefficients.

In the semicontinuous process, a flask is charged with a seed monomer mixture comprising deionized (DI) water, surfactant, acid functional monomers, (meth)acrylate ester monomers, optional co-polymerizable monomers, including optional polar monomers, vinyl monomer, and any optional chain transfer agents, pH modifiers or other additives. The mixture is stirred and heated under an inert atmosphere such as a nitrogen blanket. When the mixture has reached induction temperature, typically about 50° to about 70° C., the first initiator is added to initiate the polymerization and the reaction is allowed to exotherm. After the seed reaction is completed, the batch temperature is then raised to the feed reaction temperature, about 70° to about 85° C. At the feed reaction temperature, the monomer pre-emulsion comprising deionized water, surfactant acid functional monomers, (meth)acrylate ester monomers, optional co-polymerizable monomers, including optional polar monomers, chain transfer agents or other additives is added to the stirred flask over a period of time, typically 2 to 4 hours, while the temperature is maintained. At end of the feed reaction, the second initiator charge, if used, is added to the reaction to further reduce residual monomers in the emulsion. After an additional hour of heating, the mixture is cooled to room temperature (about 23° C.) and the emulsion is collected for evaluation.

A neutralizing agent may be employed in the preparation of this copolymer. It may be employed at a level sufficient to neutralize all or a part of the acid groups of the polymer. Neutralization is achieved via the use of an alkali metal hydroxide or a combination of an alkali metal hydroxide with a minor amount of another neutralizing agent. A wide variety of other neutralizing agents may be used as will be understood by those skilled in the art. The selection of the other neutralizing agent, and the amount employed may be varied to achieve a desired result. However, the type and amount selected must not render the adhesive non-dispersible. Preferably ammonium, sodium and potassium hydroxide are used as neutralizing agents.

The pH of the emulsion is at least 4. The acidity of the emulsion may be modified following latex formation using a pH modifier such as a basic solution (e.g., solutions of sodium hydroxide, ammonium hydroxide, lithium hydroxide and the like) or buffer solutions (e.g., sodium bicarbonate and the like), to the desired pH levels.

A alternate method of preparing a pressure sensitive adhesive article comprises partially polymerizing monomers to produce a syrup polymer comprising the acid functional (meth)acrylate copolymer and unpolymerized monomers. Generally, the aziridine crosslinking agent is added to the partially polymerized composition, then coated on a suitable substrate and further polymerized. The syrup polymer composition is polymerized to a useful coating viscosity, which may be coated onto a substrate (such as a tape backing) and further polymerized. Partial polymerization provides a coatable solution of the acid functional (meth)acrylate solute copolymer in one or more solvent monomers.

For syrup application processing, a preferred monomer mixture (second component) comprises 85 to 99 pbw of one or more (meth)acrylate ester monomers, 1 to 15 pbw of acid functional monomers, 0 to 10 pbw of one or more second, non-acid, polar monomers, and 0 to about 5 pbw of other vinyl monomers, based on 100 parts total monomer.

The polymerizations may be conducted in the presence of, or preferably in the absence of, suitable solvents such as ethyl acetate, toluene and tetrahydrofuran which are unreactive with the functional groups of the components of the syrup polymer.

Polymerization can be accomplished by exposing the syrup polymer composition to energy in the presence of a photoinitiator. Energy activated initiators may be unnecessary where, for example, ionizing radiation is used to initiate polymerization. These photoinitiators can be employed in concentrations ranging from about 0.0001 to about 3.0 pbw, preferably from about 0.001 to about 1.0 pbw, and more preferably from about 0.005 to about 0.5 pbw, per 100 pbw of the third component solvent monomer.

A preferred method of preparation of the coatable syrup polymer is photoinitiated free radical polymerization. Advantages of the photopolymerization method are that 1) heating the monomer solution is unnecessary and 2) photoinitiation is stopped completely when the activating light source is turned off. Polymerization to achieve a coatable viscosity may be conducted such that the conversion of monomers to polymer is up to about 30%. Polymerization can be terminated when the desired conversion and viscosity have been achieved by removing the light source and by bubbling air (oxygen) into the solution to quench propagating free radicals. The solute polymer(s) may be prepared conventionally in a non-monomeric solvent and advanced to high conversion (degree of polymerization). When solvent (monomeric or non-monomeric) is used, the solvent may be removed (for example by vacuum distillation) either before or after formation of the syrup polymer. While an acceptable method, this procedure involving a highly converted functional polymer is not preferred because an additional solvent removal step is required, another material may be required (the non-monomeric solvent), and dissolution of the high molecular weight, highly converted solute polymer in the monomer mixture may require a significant period of time.

Useful photoinitiators include benzoin ethers such as benzoin methyl ether and benzoin isopropyl ether; substituted acetophenones such as 2,2-dimethoxyacetophenone, available as Irgacure™ 651 photoinitiator (Ciba-Geigy Corp.; Ardsley, N.Y.), 2,2 dimethoxy-2-phenyl-1-phenylethanone, available as Esacure™ KB-1 photoinitiator (Sartomer Co.; West Chester, Pa.), and dimethoxyhydroxyacetophenone; substituted α-ketols such as 2-methyl-2-hydroxy propiophenone; aromatic sulfonyl chlorides such as 2-naphthalenesulfonyl chloride; and photoactive oximes such as 1-phenyl-1,2-propanedione-2-(O-ethoxy-carbonyl)oxime. Particularly preferred among these are the substituted acetophenones.

Preferred photoinitiators are photoactive compounds that undergo a Norrish I cleavage to generate free radicals that can initiate by addition to the acrylic double bonds. The photoinitiator can be added to the mixture to be coated after the copolymer has been formed, i.e., photoinitiator can be added to the syrup polymer mixture. Such polymerizable photoinitiators are described, for example, in U.S. Pat. Nos. 5,902,836 and 5,506,279 (Babu et al.).

The syrup polymer composition and the photoinitiator may be irradiated with activating UV radiation to polymerize the monomer component(s). UV light sources can be of two types: 1) relatively low light intensity sources such as Blacklights which provide generally 10 mW/cm$^2$ or less (as measured in accordance with procedures approved by the United States National Institute of Standards and Technology as, for example, with a UVIMAP™ UM 365 L-S radiometer manufactured by Electronic Instrumentation & Technology, Inc., in Sterling, Va.) over a wavelength range of 280 to 400 nanometers and 2) relatively high light intensity sources such as medium pressure mercury lamps which provide intensities generally greater than 10 mW/cm$^2$, preferably between 15 and 450 mW/cm$^2$. Where actinic radiation is used to fully or partially polymerize the syrup polymer composition, high intensities and short exposure times are preferred. For example, an intensity of 600 mW/cm$^2$ and an exposure time of about 1 second may be used successfully. Intensities can range from about 0.1 to about 150 mW/cm$^2$, preferably from about 0.5 to about 100 mW/cm$^2$, and more preferably from about 0.5 to about 50 mW/cm$^2$. Such photoinitiators preferably are present in an amount of from 0.1 to 1.0 pbw per 100 pbw of the syrup polymer composition.

Accordingly, relatively thick coatings (e.g., at least about 1 mil or 25.4 micrometers) can be achieved when the extinction coefficient of the photoinitiator is low.

The degree of conversion can be monitored during the irradiation by measuring the index of refraction of the polymerizing medium as previously described. Useful coating viscosities are achieved with conversions (i.e. the percentage of available monomer polymerized) in the range of up to 30%, preferably 2-20%, more preferably from 5-15%, and most preferably from 7-12%. The molecular weight (weight average) of the solute polymer(s) is at least 100,000, preferably at least 500,000.

When preparing a pressure sensitive adhesives of the invention, it is expedient for the photoinitiated polymerization reactions to proceed to virtual completion, i.e., depletion of the monomeric components, at temperatures less than about 70° C. (preferably at 50° C. or less) with reaction times less than 24 hours, preferably less than 12 hours, and more preferably less than 6 hours. These temperature ranges and reaction rates obviate the need for free radical polymerization inhibitors, which are often added to acrylic systems to stabilize against undesired, premature polymerization and gelation. Furthermore, the addition of inhibitors adds extraneous material that will remain with the system and inhibit the desired polymerization of the syrup polymer and formation of the crosslinked pressure sensitive adhesives of the invention. Free radical polymerization inhibitors are often required at processing temperatures of 70° C. and higher for reaction periods of more than about 6 to 10 hours.

In some embodiments, the adhesive copolymers may be prepared by solution methods. A typical solution polymerization method is carried out by adding the monomers, a suitable solvent, and an optional chain transfer agent to a reaction vessel, adding a free radical initiator, purging with nitrogen, and maintaining the reaction vessel at an elevated temperature, typically in the range of about 40 to 100° C. until the reaction is completed, typically in about 1 to 20 hours, depending upon the batch size and temperature. Examples of the solvent are methanol, tetrahydrofuran, ethanol, isopropanol, acetone, methyl ethyl ketone, methyl acetate, ethyl acetate, toluene, xylene, and an ethylene glycol alkyl ether. Those solvents can be used alone or as mixtures thereof.

It is preferable to coat the adhesive composition soon after preparation. The adhesive polymer composition, (containing the copolymer, monomers and aziridine crosslinking agent), either as a syrup or solution are easily coated upon suitable flexible backing materials by conventional coating techniques, then further polymerized, and cured or dried, to produce adhesive coated sheet materials. When emulsion polymerization techniques are used, an emulsion comprising the extant copolymer, aziridine crosslinking agent is coated and dried to produce adhesive coated sheet materials. The flexible backing material may be any material conventionally utilized as a tape backing, optical film or any other flexible material.

Examples of materials that can be included in the flexible support include polyolefins such as polyethylene, polypropylene (including isotactic polypropylene), polystyrene, polyester, polyvinyl alcohol, poly(ethylene terephthalate), poly(butylene terephthalate), poly(caprolactam), poly(vinylidene fluoride), polylactides, cellulose acetate, and ethyl cellulose and the like. Commercially available backing materials useful in the invention include kraft paper (available from Monadnock Paper, Inc.); cellophane (available from Flexel Corp.); spun-bond poly(ethylene) and poly(propylene), such as Tyvek™ and Typar™ (available from DuPont, Inc.); and porous films obtained from poly(ethylene) and poly(propylene), such as Teslin™ (available from PPG Industries, Inc.), and Cellguard™ (available from Hoechst-Celanese).

Backings may also be prepared of fabric such as woven fabric formed of threads of synthetic or natural materials such as cotton, nylon, rayon, glass, ceramic materials, and the like or nonwoven fabric such as air laid webs of natural or synthetic fibers or blends of these. The backing may also be formed of metal, metallized polymer films, or ceramic sheet materials may take the form of any article conventionally known to be utilized with pressure sensitive adhesive compositions such as labels, tapes, signs, covers, marking indicia, and the like.

The above-described compositions are coated on a substrate using conventional coating techniques modified as appropriate to the particular substrate. For example, these compositions can be applied to a variety of solid substrates by methods such as roller coating, flow coating, dip coating, spin coating, spray coating knife coating, and die coating. These various methods of coating allow the compositions to be placed on the substrate at variable thicknesses thus allowing a wider range of use of the compositions. Coating thicknesses may vary as previously described. The solutions may be of any desirable concentration, and degree of conversion, for subsequent coating, but is typically between 20 to 70 wt.% polymer solids, and more typically between 30 and 50 wt.% solids, in solvent. The emulsions also may be of any desirable concentration for subsequent coating, but is typically between 30 to 70 wt.% polymer solids, and generally contains less than 2% unreacted monomer. The syrup polymers may be of any desirable concentration for subsequent coating, but is typically between 5 to 20 wt.% polymer solids in monomer. The desired concentration may be achieved by further dilution of the coating composition, or by partial drying.

The flexible support may also comprise a release-coated substrate. Such substrates are typically employed when an adhesive transfer tape is provided. Examples of release-coated substrates are well known in the art and include, by way of example, silicone-coated kraft paper and the like. Tapes of the invention may also incorporate a low adhesion backsize (LAB) which are known in the art.

EXAMPLES

Test Methods:

Peel Adhesion Test [ASTM D 3330/D 3330M-04]

Two 0.5 inch strips of adhesive coated polyester film were adhered to a glass plate by rolling a 2 kg roller onto the tape. The force required to peel the tape was measured in ounces per 0.5 inches with a platen speed of 90 and 12 inches per minute. The measurements for the two tape samples were averaged. Peel adhesion data was then normalized to Newtons/decimeter (N/dm) for the tables below.

Shear Strength Test [ASTM D-3654/D 3654M 06 PSTC-7]

A 0.5 inch strip of adhesive coated polyester film was adhered by its adhesive to a stainless steel plate and cut down to leave a 0.5 inch by 0.5 inch square for room temperature shear testing and a 1.0 inch by 0.5 inch square for shear testing at 70° C. A weight of 2 kg was rolled over the adhered portion. A 1000 g load was attached to the tape sample for room temperature shear testing and a 500 g load was used for shear testing at 70 ° C. Each sample was suspended until failure and/or test terminated. The time to failure as well as the mode of failure were recorded. Samples were run in triplicate and averaged for the tables below. In Table 4, the shear strength was tested on fiberboard at room temperature only.

Preparation of aziridine Crosslinking Agents

The aziridine crosslinking agents may be prepared by the Michael addition of the aziridine to an acryloyl compound. Generally, 1.1 to 4 equivalents of 2-methylaziridine are mixed with an (meth)acrylate or (meth)acrylamide, followed by standing at room temperature. The excess 2-methylaziridine is removed under reduced pressure to yield the Michael adduct, which may be used without further purification. Methacrylates and acrylamides generally require heating at about 70° C. with 1.1 to 4 equivalents of 2-methylaziridine for 1 to 7 days.

Preparation of 3-(2-methylaziridin-1-yl)propionic acid butyl ester (compound I)

To 25.6 g (0.20 mol) of n-butyl acrylate (Aldrich) was added 19.0 g (0.30 mol) of 2-methylaziridine (Aldrich, 90%) to cause a mildly exothermic reaction. The reaction mixture was allowed to stand at room temperature for 20 hours. At that time analysis of the reaction mixture by NMR spectroscopy indicated complete absence of vinylic protons of the starting n-butyl acrylate and formation of the title compound. The excess 2-methylaziridine was removed at reduced pressure to leave 37.1 g (100%) of the title compound as a colorless oil.

Using essentially the same procedure, aziridine compounds II to IX were prepared using the reactants and reaction conditions as shown in Table 1.

TABLE 1

Aziridine crosslinking agents.

| Compound # | Aziridine Crosslinking Agent | Acrylate | Me-Aziridine | Reaction Conditions |
|---|---|---|---|---|
| I | 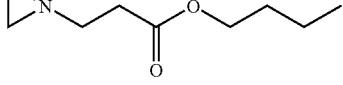 | Butyl Acrylate 0.20 mol, 25.6 g | 0.30 mol, 19.0 g | RT, 20 hr |
| II | 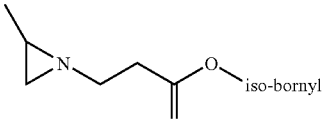 | Isobornyl acrylate 0.15 mol, 31.2 g | 0.23 mol, 14.3 g | RT, 20 hr |
| III | 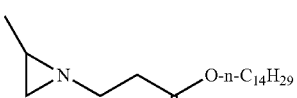 | Tetradecyl acrylate 0.10 mol, 26.8 g | 0.15 mol, 9.5 g | RT, 20 hr |
| IV |  | Isooctyl Acrylate 0.15 mol, 27.6 g | 0.60 mol, 38.0 g | 70° C., 90 min |
| V | 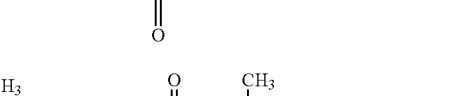 | 2-Octyl acrylate 0.20 mol, 36.8 g | 0.22 mol, 14.0 g | RT, 20 hr |
| VI | 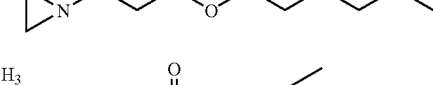 | 2-Ethylhexyl acrylate 0.20 mol, 36.8 g | 0.22 mol, 14.0 g | RT, 20 hr |
| VII | 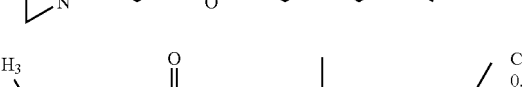 | Citronellyl acrylate 0.15 mol, 31.5 g | 0.21 mol, 13.5 g | RT, 20 hr, then 70° C., 1 hr |
| VIII |  | Methyl acrylate 0.20 mol, 17.2 g | 0.25 mol, 15.9 g | RT, 20 hr |
| IX | 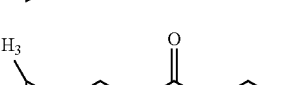 | Ethyl acrylate 0.20 mol, 20.0 g | 0.25 mol, 15.9 g | RT, 20 hr |

Materials

| Abbreviation or Trade Designation | Description |
|---|---|
| IOA | Isooctyl acrylate |
| BuA | Butyl acrylate |
| 2-EHA | 2-Ethylhexyl acrylate |
| 2-OA | 2-Octyl acrylate |
| dHCA | Dihydrocitronellyl acrylate |

-continued

| Abbreviation or Trade Designation | Description |
|---|---|
| AA | Acrylic Acid |
| PSA-I | Acrylic emulsion adhesive (FASTBOND 49) commercially available from 3M Company, St. Paul, MN. |

Examples 2A-U and Comparative C1, C2 and C3

Preparation of the Syrup Copolymer

A sixteen-ounce (~473 mL) jar was charged with 450 g of isooctyl acrylate (IOA, 90 parts), 50 g of acrylic acid (AA, 10 parts), and 0.2 g of 2,2-dimethoxy-2-phenylacetophenone photoinitiator (Irgacure 651, 0.04 phr). The monomer mixture was purged with nitrogen for 20 minutes then exposed to low intensity ultraviolet radiation until a coatable syrup copolymer was prepared, after which an additional 0.8 g (0.16 phr) of the photoinitiator was added. Similar syrup copolymers were prepared using BuA, 2-EHA, 2-OA and dHCA.

The pre-adhesive polymer syrup was blended with various concentrations of the aziridine crosslinking agent as shown in Tables 2A-E. The aziridine concentration in Tables 2a-e is based on the weight percent of pre-adhesive polymer syrup. The formulations were then coated on Mitsubishi Hostphan™ primed polyester film at a 2-mil (~50 micrometers) thickness for the syrup preadhesive formulations and cured at 500 mJ/cm$^2$.

For comparative purposes, control examples using no crosslinking agent (Example C1), or using 1,6-hexanediol diacrylate (using 0.1 phr in Example C2) or 2-(3,4-dimethoxyphenyl)-4,6-bis-trichloromethyl-triazine (using 0.1 phr in Example C3) as the crosslinking agents were also prepared and tested. Peel Adhesion and Shear Strength were measured for tapes prepared from these adhesive as described in the test methods above and the data is shown in Tables 2A-E.

TABLE 2A

Syrup copolymer IOA/AA (90/10)

| Ex. | Aziridine Sample # | Aziridine crosslinking agent (phr) | Syrup | Peel Adhesion on Glass (N/dm) 90 in/min | Peel Adhesion on Glass (N/dm) 12 in/min | Shear Strength on SS (min) RT | Shear Strength on SS (min) 70° C. |
|---|---|---|---|---|---|---|---|
| C1 | — | — | IOA/AA | 104 | 53 | 161 (c) | 21 (c) |
| C2 | — | — | IOA/AA | 94 | 68 | 1871 (c) | 2707 (c) |
| C3 | — | — | IOA/AA | 98 | 76 | 10,000+ | 10,000+ |
| 2A | I | 2 | IOA/AA | 101 | 73 | 2310 (c) | 84 (c) |
| 2B | I | 3 | IOA/AA | 94 | 69 | 3803 (c) | 10,000+ |
| 2C | I | 5 | IOA/AA | 98 | 69 | 4544 (c) | 10,000+ |
| 2D | II | 2 | IOA/AA | 100 | 65 | 1077 (c) | 70 (c) |
| 2E | III | 2 | IOA/AA | 93 | 65 | 1197 (c) | 114 (c) |
| 2F | IV | 1 | IOA/AA | 97 | 71 | 150 (c) | 27 (c) |
| 2G | IV | 2 | IOA/AA | 89 | 66 | 10,000+ | 10,000+ |
| 2H | IV | 3 | IOA/AA | 93 | 72 | 10,000+ | 10,000+ |
| 2I | IV | 5 | IOA/AA | 95 | 62 | 10,000+ | 10,000+ |
| 2J | V | 1 | IOA/AA | 86 | 58 | 83 (c) | 12 (c) |
| 2K | V | 2 | IOA/AA | 97 | 72 | 169 (c) | — |
| 2L | VI | 2 | IOA/AA | 85 | 66 | 168 (c) | 17 (c) |
| 2M | VII | 2 | IOA/AA | 85 | 60 | 10,000+ | 10,000+ |

Failure mode legend:
(c) stands for cohesive,
(po) stands for pop off.

TABLE 2B

Syrup copolymer of BuA/AA (90/10)

| Ex. | Aziridine Sample # | Aziridine crosslinking agent (phr) | Syrup | Peel Adhesion on Glass (N/dm) 90 in/min | Peel Adhesion on Glass (N/dm) 12 in/min | Shear Strength on SS (min) RT | Shear Strength on SS (min) 70° C. |
|---|---|---|---|---|---|---|---|
| 2N | I | 2 | BuA/AA | 86 | 64 | 29 (c) | 111 (c) |
| 2O | I | 5 | BuA/AA | 87 | 71 | 40 (c) | 10,000+ |

Failure mode legend:
(c) stands for cohesive,
(po) stands for pop off.

TABLE 2C

Syrup copolymer of 2-OA/AA (90/10)

| Ex. | Sample # | Aziridine crosslinking agent (phr) | Syrup | Peel Adhesion on Glass (N/dm) 90 in/min | Peel Adhesion on Glass (N/dm) 12 in/min | Shear Strength on SS (min) RT | Shear Strength on SS (min) 70° C. |
|---|---|---|---|---|---|---|---|
| 2P | IV | 1 | 2-OA/AA | 98 | 73 | 1146 (c) | 89 (c) |
| 2Q | V | 1 | 2-OA/AA | 90 | 69 | 862 (c) | 41 (c) |

Failure mode legend:
(c) stands for cohesive,
(po) stands for pop off.

TABLE 2D

Syrup copolymer of 2-EHA/AA (90/10)

| Ex. | Sample # | Aziridine crosslinking agent (phr) | Syrup | Peel Adhesion on Glass (N/dm) 90 in/min | Peel Adhesion on Glass (N/dm) 12 in/min | Shear Strength on SS (min) RT | Shear Strength on SS (min) 70° C. |
|---|---|---|---|---|---|---|---|
| 2R | IV | 2 | 2-EHA/AA | 87 | 68 | 1082 (c) | 10,000+ |
| 2S | VI | 2 | 2-EHA/AA | 102 | 72 | 267 (c) | 24 (c) |

Failure mode legend:
(c) stands for cohesive,
(po) stands for pop off.

TABLE 2E

Syrup copolymer of dHCA/AA (90/10)

| Ex. | Sample # | Aziridine crosslinking agent (phr) | Syrup | Peel Adhesion on Glass (N/dm) 90 in/min | Peel Adhesion on Glass (N/dm) 12 in/min | Shear Strength on SS (min) RT | Shear Strength on SS (min) 70° C. |
|---|---|---|---|---|---|---|---|
| 2T | IV | 2 | dHCA | 87 | 66 | 10,000+ | 10,000+ |
| 2U | VII | 2 | dHCA | 102 | 66 | 10,000+ | 10,000+ |

Failure mode legend:
(c) stands for cohesive,
(po) stands for pop off.

Example 3A-J and Comparative C4

Preparation of Solution Copolymer

In a glass polymerization bottle were charged isooctyl acrylate (IOA) or 2-octyl acrylate (2-OA), acrylic acid, 2,2'-azobis(2-methylbutyronitrile) (VAZO™ 67), and ethyl acetate. The bottle was purged with nitrogen for five minutes, sealed, and placed in a water bath maintained at 60° C. for 24 hours.

A series of pre-adhesive copolymer compositions prepared by the solution polymerization were combined with the crosslinking agent as in Tables 3A-B. The formulations were then coated on Mitsubishi Hostphan™ primed polyester film to give a dried thickness of 1 mil (~25 micrometers).

For comparative purposes, a control example using no crosslinking agent (Example C4), was also prepared and tested. Peel Adhesion and Shear Strength were measured for tapes prepared from these adhesive as described in the test methods above and the data is shown in Tables 3A-B.

TABLE 3A

Solution copolymers of 2-OA/AA (93/7)

| Ex. | Aziridine Sample # | Aziridine crosslinking agent (phr) | Polymer | Peel Adhesion on Glass (N/dm) 90 in/min | Peel Adhesion on Glass (N/dm) 12 in/min | Shear Strength on SS (min) RT |
|---|---|---|---|---|---|---|
| C4 | — | — | 2-OA/AA | 77 | 63 | 24 (c) |
| 3A | I | 1 | 2-OA/AA | 66 | 48 | 114 (c) |
| 3B | I | 5 | 2-OA/AA | 73 | 48 | 149 (c) |
| 3C | IV | 1 | 2-OA/AA | 72 | 57 | 203 (c) |
| 3D | IV | 5 | 2-OA/AA | 74 | 36 | 9393 (po) |
| 3E | VIII | 5 | 2-OA/AA | 75 | 61 | 29 (c) |
| 3F | IX | 5 | 2-OA/AA | 76 | 55 | 29 (c) |

Failure mode legend:
(c) stands for cohesive,
(po) stands for pop off.

TABLE 3B

Solution copolymers of 2-OA/AA (90/10) and IOA/AA (90/10)

| Ex. | Aziridine Sample # | Aziridine crosslinking agent (phr) | Polymer | Peel Adhesion on Glass (N/dm) 90 in/min | Peel Adhesion on Glass (N/dm) 12 in/min | Shear Strength on SS (min) RT |
|---|---|---|---|---|---|---|
| 3G | I | 5 | 2-OA/AA | 39* | 57 | 475 (c) |
| 3H | I | 5 | IOA/AA | 21* | 35 | 353 (c) |
| 3I | IV | 5 | 2-OA/AA | — | — | 693 (c) |
| 3J | IV | 5 | IOA/AA | 58 | 38 | 1356 (c) |

Failure mode legend:
(c) stands for cohesive,
(po) stands for pop off,
*shocky peel.

Example 4A-H and Comparative C5

The emulsion polymer (PSA-I) was blended with various concentrations of the aziridine crosslinking agent as shown in Table 4. The adhesive solutions were then coated on Mitsubishi, Hostphan primed polyester film to give a 1 mil (~50 micrometers) dried adhesive thickness.

For comparative purposes, a control example using no crosslinking agent (Example C5), was also prepared and tested. Peel Adhesion and Shear Strength were measured for tapes prepared from these adhesive as described in the test methods above and the data is shown in Table 4.

TABLE 4

Emulsion copolymers of PSA-I

| Ex. | Aziridine Sample # | Aziridine crosslinking agent (phr) | Peel Adhesion on Glass (N/dm) 90 in/min | Shear Strength on fiberboard (min) RT |
|---|---|---|---|---|
| C5 | — | — | 20 | 107 (c) |
| 4A | VIII | 0.5 | 15 | 156 (po) |
| 4B | " | 1 | 13 | 263 (po) |
| 4C | " | 2 | 14 | 486 (po) |
| 4D | " | 3 | 14 | 1112 (po) |
| 4E | IX | 0.5 | 13 | 137 (po) |
| 4F | " | 1 | 13 | 122 (po) |
| 4G | " | 2 | 14 | 534 (po) |
| 4H | " | 3 | 15 | 1513 (po) |

Failure mode legend:
(c) stands for cohesive,
(po) stands for pop off.

The invention claimed is:

1. A crosslinkable composition comprising an acid-functional (meth)acrylate copolymer and an aziridine crosslinking agent of the formula:

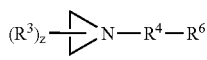

wherein
each $R^3$ is independently —H or a $C_1$-$C_4$ alkyl group,
z is 0, 1 or 2;
$R^4$ is a divalent alkylene, optionally substituted by one or more catenary ester groups, urea groups and/or urethane groups, and
$R^6$ is a monovalent alkyl or aryl group.

2. The crosslinkable composition of claim 1, wherein said crosslinking agent is of the formula:

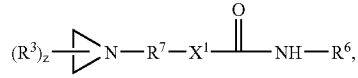

wherein
each $R^3$ is independently H or a $C_1$-$C_4$ alkyl group,
$R^7$ is a divalent alkylene,
$X^1$ is —$NR^3$— or —O—,
$R^6$ is a monovalent alkyl or aryl group, and
z is 0, 1 or 2.

3. The crosslinkable composition of claim 1, wherein said crosslinking agent is of the formula:

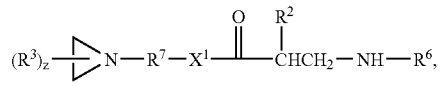

where
$R^2$ is —H, or —$CH_3$;
each $R^3$ is independently H or a $C_1$-$C_4$ alkyl group,
z is 0, 1 or 2;
$R^7$ is a divalent alkylene,
$X^1$ is —$NR^3$— or —O—, and
$R^6$ is a monovalent alkyl or aryl group.

4. The crosslinkable composition of claim 1, wherein said crosslinking agent is of the formula:

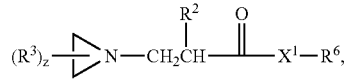

where
$R^2$ is —H, or —$CH_3$;
each $R^3$ is independently H or a $C_1$-$C_4$ alkyl group,
z is 0, 1 or 2;
$X^1$ is —$NR^3$— or —O—, and
$R^6$ is a monovalent alkyl or aryl group.

5. The crosslinkable composition of claim 1 wherein the acid-functional (meth)acrylate copolymer comprises:
  i. 85 to 99 parts by weight of an (meth)acrylic acid ester of non-tertiary alcohol;
  ii. 1 to 15 parts by weight of an acid functional ethylenically unsaturated monomer;
  iii. 0 to 10 parts by weight of a non-acid functional, ethylenically unsaturated polar monomer;
  iv. 0 to 5 parts vinyl monomer; and
  v. 0 to 5 parts of a multifunctional (meth)acrylate;
  based on 100 parts by weight total monomer.

6. The crosslinkable composition of claim 1 comprising 0.005 to 5.0 parts by weight of an aziridine crosslinking agent, relative to 100 parts of the copolymer.

7. The crosslinkable composition of claim 5 wherein said non-acid functional, ethylenically unsaturated polar monomer is selected from 2-hydroxyethyl (meth)acrylate; N-vinylpyrrolidone; N-vinylcaprolactam; acrylamide; t-butyl acrylamide; dimethylamino ethyl arylamide; N-octyl acrylamide; poly(alkoxyalkyl) (meth)acrylates; poly(vinyl methyl ether); and mixtures thereof.

8. The crosslinkable composition of claim 1 wherein said copolymer comprises 1 to 5 parts by weight of acrylic acid and 1 to 5 parts by weight of a non-acid functional, ethylenically unsaturated polar monomer.

9. The crosslinkable composition of claim 1 wherein said composition is an aqueous emulsion.

10. The crosslinkable composition of claim 5 wherein the acid functional monomer is selected from acrylic acid, methacrylic acid, itaconic acid, fumaric acid, crotonic acid, citraconic acid, maleic acid, oleic acid, β-carboxyethyl(meth)acrylate, 2-sulfoethyl methacrylate, styrene sulfonic acid, 2-acrylamido-2-methylpropane sulfonic acid, vinyl phosphonic acid, and mixtures thereof.

11. The crosslinkable composition of claim 5 comprising 1 to 5 parts of a vinyl monomer selected from vinyl esters, styrene, substituted styrene, vinyl halide, vinyl propionate, and mixtures thereof.

12. The crosslinkable composition of claim 5 with the average number of carbon atoms of the non-tertiary alcohol being from about 4 to about 12.

13. A pressure sensitive adhesive comprising the crosslinked composition of claim 1.

14. The crosslinkable composition of claim 5 wherein said non-tertiary alcohol of said (meth)acrylic acid ester of non-tertiary alcohol is selected from 2-octanol or dihydrocitronellol.

15. An adhesive article comprising the crosslinked composition of claim 1 and a flexible backing layer.

16. An emulsion comprising:
   (a) 30 to about 70 weight percent, based on the total weight of the emulsion, of the crosslinkable composition of claim 1, and
   (b) 30 to 70 weight percent of an aqueous phase comprising a surfactant, based on the total weight of the emulsion.

17. The emulsion of claim 16 wherein said composition has a pH of $\geqq 4$.

18. A solution comprising the crosslinkable composition of claim 1 and an organic solvent.

* * * * *

UNITED STATES PATENT AND TRADEMARK OFFICE
CERTIFICATE OF CORRECTION

PATENT NO. : 7,652,103 B2 Page 1 of 1
APPLICATION NO. : 12/031535
DATED : January 26, 2010
INVENTOR(S) : Maureen A. Kavanagh It is certified that error appears in the above-identified patent and that said Letters Patent is hereby corrected as shown below:

Column 7,
Line 17, delete "1 or2;" and insert -- 1 or 2; --.

Column 8,
Line 49, delete "thereof," and insert -- thereof; --.

Column 22,
Line 65, in claim 7, delete "arylamide;" and insert -- acrylamide; --.

Signed and Sealed this

Twenty-third Day of March, 2010

David J. Kappos
*Director of the United States Patent and Trademark Office*